United States Patent
Ryugo et al.

(12)

(10) Patent No.: US 6,221,929 B1
(45) Date of Patent: Apr. 24, 2001

(54) RIGID FOAMED POLYURETHANE-FORMING COMPOSITIONS, FOAMED POLYURETHANE MOLDINGS AND MODELS MADE OF THE SAME

(75) Inventors: Jiro Ryugo; Yuichi Sasatani, both of Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/284,281

(22) PCT Filed: Oct. 20, 1997

(86) PCT No.: PCT/JP97/03788

§ 371 Date: Apr. 12, 1999

§ 102(e) Date: Apr. 12, 1999

(87) PCT Pub. No.: WO98/17703

PCT Pub. Date: Apr. 30, 1998

(30) Foreign Application Priority Data

Oct. 24, 1996 (JP) .................................................. 8-301369

(51) Int. Cl.$^7$ .................................................. C08G 18/14
(52) U.S. Cl. ........................ 521/114; 521/155; 521/170; 521/174
(58) Field of Search .................................. 521/114, 170, 521/155, 174

(56) References Cited

U.S. PATENT DOCUMENTS 4,780,484   10/1988   Schubert et al. .
4,916,173   4/1990    Otloski et al. .
5,401,785   3/1995    Kumagai et al. .

FOREIGN PATENT DOCUMENTS

| 0 341 210 A1 | 11/1989 | (EP) . |
| 1 498 030 | 1/1978 | (GB) . |
| 2 244 714 | 12/1991 | (GB) . |
| 63-86713 | 4/1988 | (JP) . |
| 1-224137 | 9/1989 | (JP) . |
| 6-329747 | 11/1994 | (JP) . |
| 6-329903 | 11/1994 | (JP) . |

Primary Examiner—John M. Cooney, Jr.
(74) Attorney, Agent, or Firm—Finnegan, Henderson, Farabow, Garrett & Dunner, L.L.P.

(57) ABSTRACT

A rigid foamed polyurethane molding which reduce dust-scattering in cutting and is useful to a modeling stock. Said molding is produced by curing a composition by a mechanical frothing method, said composition comprising: a polyol with a filler (c); and a slight amount of dehydrating agent (d);

wherein said composition further contains 3 to 30 percent, based on the total weight of the composition, of a (poly) oxyalkylene compound (e) expressed by the general formula $$Z[(AO)_m X]_n$$

in which "A" represents an alkylene group with two to four carbon atoms; "X" is a hydrocarbyl group or an acyl group; "m" is a value of one to one hundred; "n" is an integer of one to six; and "Z" is a residue produced by removing the active hydrogen atoms from a compound containing n active hydrogen atoms, in which at least one of Z and n X's has 5 to 20 carbon atoms.

11 Claims, No Drawings

RIGID FOAMED POLYURETHANE-FORMING COMPOSITIONS, FOAMED POLYURETHANE MOLDINGS AND MODELS MADE OF THE SAME

TECHNICAL FIELD

The present invention relates to a rigid foamed polyurethane-forming composition, a foamed polyurethane molding and a model. More particularly, the present invention relates to a rigid foamed polyurethane molding suitable for cutting and a model obtained by cutting the same foam molding.

BACKGROUND ART

Such models as mock-ups or full-sized models of cars or household electronic products and master models or master mold forms are built of rigid foamed polyurethane blocks by cutting. Rigid foamed polyurethane blocks as modeling stock are made by such processes as one in which a basic material composition is mixed with hollow microspheres as weight-reducing agent and is allowed to cure in a mold and another one in which an inert gas is dispersed in the basic material composition by an agitator to reduce weight and the composition is allowed to cure in a mold in that state. The latter is known as a mechanical frothing method. Those techniques are disclosed in U.S. Pat. Nos. 4,916,173 and 5,401,785.

The problem with the prior art rigid foamed polyurethanes is, however, that much dust tends to rise in cutting work, contaminating the working environment. That is especially the case with polyurethane moldings in which inorganic fillers such as talc and calcium carbonate are used in large quantities to improve the dimensional stability and those of which the density is lowered for better manual workability. And demands have been voiced for an improvement in that aspect.

It is an object of the present invention to provide a rigid foamed polyurethane which is largely free from dust-scattering in cutting work.

It is another object of the present invention to provide a composition from which such a low dust-scattering foamed polyurethane can be obtained.

It is still another object of the present invention to provide a model made of such a low dust-scattering foamed polyurethane.

DISCLOSURE OF INVENTION

The objects of the present invention are attained by the following [1] to [4].

[1] A rigid foamed polyurethane-forming composition, which comprises:
a polyol with a hydroxyl value of 200 to 700 (a); an organic polyisocyanate (b); a filler comprising an inorganic powder and/or a hollow microsphere (c); and a dehydrating agent (d);
wherein said composition further contains 3 to 30 percent, based on the total weight of the composition, of a (poly) oxyalkylene compound (e) expressed by the general formula

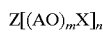

$Z[(AO)_mX]_n$ in which "A" represents an alkylene group with two to four carbon atoms; "X" is a hydrocarbyl group or an acyl group; "m" is a value of one to one hundred; "n" is an integer of one to six; and "Z" is a residue produced by removing the active hydrogen atoms from a compound containing n active hydrogen atoms, in which at least one of Z and n X's has 5 to 20 carbon atoms and "X" may be either the same or different in case "n" is two or more.

[2] A rigid foamed polyurethane molding obtainable by curing a composition comprising a polyol with a hydroxyl value of 200 to 700 (a); an organic polyisocyanate (b); a filler comprising an inorganic powder and/or a hollow microsphere (c); and a dehydrating agent (d).

The aforesaid composition further contains 3 to 30 percent, based on the total weight of the composition, of the above-mentioned (poly) oxyalkylene compound (e) and the above-mentioned curing is effected under finely dispersed bubble containing conditions.

[3] A method of making a rigid foamed polyurethane molding, which comprises curing a composition by a mechanical frothing method, said composition comprising: a polyol with a hydroxyl value of 200 to 700 (a); an organic polyisocyanate (b); a filler comprising an inorganic powder and/or a hollow microsphere (c); and a dehydrating agent (d);
wherein said composition further containing 3 to 30 percent, based on the total weight of the composition, of the above-mentioned (poly) oxyalkylene compound (e).

[4] A model obtainable by cutting the molding described in above-mentioned [2].

The aforesaid (poly) oxyalkylene compound (e) acts as a dust-scattering reducer in the present invention.

BEST MODE FOR CARRYING OUT INVENTION

[Concrete Examples of Polyol (a)]

Among the polyols with a hydroxyl value of 200 to 700 (a) suitable for use in the present invention are polyether polyol, polyester polyol and other polyols.

As examples of the polyether polyol, the following compounds are named: those obtainable by addition of alkylene oxide to compounds which have at least two and preferably three to eight active hydrogen atoms such as polyhydric alcohol, polyhydric phenol, amines, polycarboxylic acid, phosphoric acid, and mixtures of two or more of them.

The polyhydric alcohols include the following compounds: dihydric to octahydric ones such as ethylene glycol, propylene glycol, glycerol, trimethylolpropane, pentaerythritol, methylglucoside, diglycerol, sorbitol and sucrose.

Among the polyhydric phenols are hydroquinone, bisphenol A and phenol-formaldehyde condensation products.

The following may be cited as amines: triethanol amine, triisopropanol amine, ethylene diamine, diethylene triamine, toluene diamine and diphenyl methane diamine.

As the polycarboxylic acids may be cited the following: aliphatic dicarboxylic acids (anhydride) such as adipic acid, sebacic acid and maleic anhydride; and aromatic polycarboxylic acids such as phthalic anhydride, terephthalic acid, trimellitic acid and pyromellitic acid.

Among the alkylene oxides to add to the compounds containing active hydrogen atoms are ethylene oxide (EO), propylene oxide (PO), 1, 2-, 2, 3-, 1, 4- or 2, 3-butylene oxide, styrene oxide, and combinations of these compounds, which may be added blockwise and/or randomwise. Among those, preferred are PO and the combination of EO and PO.

As the polyester polyols, the following compounds may be named: polyester polyols condensated from polycarboxylic acids and polyols, and lactone polyester polyols produced by lactone ring-opening polymerization.

The above-mentioned polycarboxylic acids include those named above as the raw materials for polyether polyols. Preferred are adipic acid, phthalic anhydride and terephthalic acid.

Among the aforesaid polyols are polyhydric alcohols cited above as the raw materials for polyether polyols and their alkylene oxide low-mol adducts (usually, one to three mols). Preferred are 1,4-butanediol, ethylene glycol, and diethylene glycol.

The concrete examples of the condensated polyester polyols include poly (1,4-butanediol) adipate, poly (1,4-butanediol) terephthalate and poly (diethylene glycol) terephthalate.

Lactones used in the lactrone polyester polyols include ε-caprolactone and δ-valerolactone. Preferred is ε-caprolactone. Among the concrete examples of lactone polyester polyols is poly ε-caprolactone polyol.

The other polyols include such compounds as polyether polyols graft-modified with the homopolymer or copolymer of such vinyl compounds as acrylonitrile, styrene and methyl methacrylate, polybutadiene polyols and hydroxyl group-contained vinyl polymers (acrylic polyols such as ones disclosed in examined Japanese patent application No. 58-57413).

The hydroxyl value of the polyols (a) is generally between 200 and 700, and preferably between 250 and 600. With a hydroxyl value less than 200, the resulting polyurethane moldings are insufficient in heat resistance and strength for use as modeling stock. In case where a hydroxyl value is more than 700, the moldings are too rigid and brittle, and what is more, those moldings tend to scorch because of the heat of reaction between polyol (a) and polyisocyanate (b).

Of the polyols (a), the preferable are alkylene oxide adducts of polyhydric alcohol. Especially preferred are polypropylene oxide adducts of gylcerol, trimethylolpropane, triethanol amine, pentaerythritol, sorbitol and sucrose.

Other active hydrogen-contained compounds than those polyols (a) may be used in combination with those polyols (a) so long as the properties required in the modeling stock remain unimpaired.

As other active hydrogen-contained compounds than those polyols (a) may be named the following: polyols with a hydroxyl value of less than 200 (high-molecular weight polyether polyols, caster oil, and the like), polyamines (diethyl tolylene diamine, 2,2', 3,3'-tetrachloro-4,4'-diaminodiphenyl methane and the like).

[Concrete Examples of Polyisocyanate (b)]

As the polyisocyanate (b) in the present invention, there may be used those that have been used in the manufacture of urethane foams.

Suitable polyisocyanates include aromatic polyisocyanates such as toluene didisocyanate (TDI), diphenyl methane diisocyanate (MDI), polymethylene polyphenyl isocyanate (polymeric MDI), p-phenylene diisocyanate, 3,3'-dimethyl diphenyl 4,4'-diisocyanate, dianisidine diisocyanate, m-xylene diisocyanate, tetramethyl xylene diisocyanate and 1,5-naphthalene diisocyanate;

aliphatic polyisocyanates such as 1,6-hexamethylene diisocyanate and 2,2,4(2,4,4)-trimethylhexamethylene diisocyanate;

alicyclic polyisocyanates such as 4,4'-dicyclohexyl methane diisocyanate (hydrogenated MDI), 1,4-cyclohexyl diisocyanate and methyl cyclohexyl diisocyanate (hydrogenated TDI);

aralipatic polyisocyanates such as xylene diisocyanate and tetramethyl xylene diisocyanate;

modified isocyanates such as urethane-modified TDI, urethane-modified MDI, carbodiimide-modified MDI.

Among those compounds, preferred are aromatic polyisocyanates. Especially preferred is polymethylene polyphenyl isocyanate.

[Concrete Examples of Filler (c)]

The fillers (c) used in the present invention comprise an inorganic powder and/or hollow microspheres. of them, the inorganic powders include calcium carbonate, talc, aluminum hydroxide, calcium sulfate, mica and milled fiber. Among them, preferred are calcium carbonate and talc.

Of the fillers (c), the hollow microspheres include microspheres made of thermoplastic resins such as polyvinylidene chloride, polymethyl methacrylate and polyacrylonitrile; microspheres made of thermosetting resins such as phenol resin, epoxy resin and urea resin; and microspheres made of inorganic matters such as glass, alumina, 'shirasu' (volcanic white sand) and carbon. The hollow microspheres have generally an average diameter of 10 to 200 microns and generally a bulk specific gravity of 0.01 to 0.5.

Concrete examples of such hollow microspheres are those supplied under the brandnames "Matsumoto Microsphere F-80 ED" and "Matsumoto Microsphere MFL" series (produced by Matsumoto Yushi-Seiyaku Co., Ltd., Japan), "Phenolic Microballoon BJO-0930"(produced by Union Carbide Corp., USA) and "Glass Bubbles K-15, K-37" (produced by Sumitomo 3M Ltd.(Scotchlite)).

[Concrete Examples of Dehydrating Agent (d)]

Dehydrating compounds in general use can be used as the dehydrating agent (d) in the present invention. But preferred are neutral or alkaline dehydrating agents with a particle size of 0.1 to 50 microns. The examples of such compounds include calcium oxide, calcium sulfate (hemihydrate gypsum), calcium chloride and molecular sieve. Preferred are calcium sulfate (hemihydrate gypsum) and molecular sieve.

[Concrete Examples of (Poly)oxy Alkylene Compound (e)]

In the present invention, the (Poly)oxyl alkylene compound (e) acting as a dust-scattering reducer is expressed, as mentioned earlier, by the general formula: $Z[(AO)_m X]_n$.

In the formula, "A" represents an alkylene group with two to four carbon atoms such as ethylene group, propylene group, and 1,2-, 1,3- and 1,4-butylene groups. Preferred are an ethylene group and a propylene group.

In the formula, "X" represents a univalent hydrocarbon group or acyl group.

The univalent hydrocarbon groups include saturated or unsaturated aliphatic hydrocarbon groups generally with one to 30 carbon atoms (e.g., methyl, ethyl, propyl, butyl, 2-ethyl hexyl, capryl, lauryl, tridecyl, oleyl and stearyl); alicyclic hydrocarbon groups with 5 to 20 carbon atoms (e.g., cyclopentyl, cyclohexyl, cyclononyl and nonyl cyclohexyl); aromatic hydrocarbon groups with 6 to 30 carbon atoms (e.g., phenyl, naphtyl, alkyl (one to ten carbon atoms) phenyl, styrylated phenyl, benzyl, phenyl ethyl and tolyl methyl); and preferably aliphatic hydrocarbon groups with 5 to 20 carbon atoms.

Among such univalent acyl groups are saturated or unsaturated aliphatic acyl groups with two to 20 carbon atoms (e.g., acetyl, propionyl, butyryl, valeryl, enanthoyl, capryloyl, pelargoyl, capryol, lauroyl, tridecyloyl, myristoyl, palmitoyl, stearoyl and oleoyl); aromatic acyl groups with 7 to 12 carbon atoms (e.g., benzoyl, toluoyl, cinnamoyl, naphthoyl); and alicyclic acyl groups with 7 to 12 carbon atoms (e.g., compounds produced by hydrogenating the aforesaid aromatic acyl groups), and preferably aliphatic acyl groups with 5 to 20 carbon atoms.

In the formula, "m" is a value of one to one hundred, preferably four to 20, and "n" is a value of one to six, and preferably one to three. In case "m" is larger than one, then "(AO)m" represents a group formed with m oxyalkylene groups combining in the form of a chain.

In the formula, "Z" represents a residue obtained by removing the active hydrogen atoms from a compound having n active hydrogen atoms. Such compounds having n active hydrogen atoms include alcohols, phenols, carboxylic acids and amines.

Among the alcohols are:

saturated or unsaturated aliphatic alcohols with one to 30 carbon atoms, e.g., methanol, ethanol, propanol, butanol, amyl alcohol, lauryl alcohol, myristyl alcohol, cetyl alcohol, stearyl alcohol and oleyl alcohol;

dihydric alcohols, e.g., ethylene glycol, diethylene glycol, propylene glycol, 1,3- or 1,4-butane diol, 1,6-hexane diol and neopentyl glycol;

trihydric alcohols, e.g., glycerol, trimethylol propane, trimethylol ethane, hexanetriol and triethanol amine;

tetrahydric alcohols, e.g., pentaerythritol, methyl glycoside and diglycerol;

pentahydric alcohols, e.g., arabitol and xylitol; and hexahydric alcohols, e.g., mannitol and sorbitol.

The phenols include monohydric phenols, e.g., phenol and alkyl (one to 10 carbon atoms) phenol; monocyclic polyhydric phenols, e.g., pyrogallol, hydroquinone and fluoroglycine; bisphenols, e.g., bisphenol A and bisphenol sulfone; and condensation products of phenol and formaldehyde (novolack).

Among the carboxylic acids are saturated or unsaturated aliphatic carboxylic acids with two to 20 carbon atoms, e.g., acetic, propionic, 2-ethylhexanoic, caproic, caprylic, capric, lauric, myristic, palmitic, stearic, oleic, linolic and linolenic acids;

Aliphatic dicarboxylic acids with three to 12 carbon atoms, e.g., malonic, succinic, glutaric, adipic, sebacic, suberic, methylsuccinic, α-methyladipic, maleic, fumaric and itaconic acids;

Aromatic dicarboxylic acids with 8 to 20 carbon atoms, e.g., phthalic, naphthalene dicarboxylic, diphenyl dicarboxylic, diphenyl methane dicarboxylic and diphenyl sulfone dicarboxylic acids;

Alicyclic dicarboxylic acids with 8 to 20 carbon atoms, e.g., hydrogenated products of the aforesaid aromatic dicarboxylic acids.

The amines include aliphatic amines, alicyclic amines, heterocyclic amines and aromatic amines. Among the aliphatic amines are alkanolamines, e.g., mono-, di- and triethanol amines, isopropanol amine, amine ethyl ethanol amine; alkyl amines with one to 20 carbon atoms; alkylene diamines with two to six carbon atoms, e.g., ethylene diamine, propylene diamine, hexamethylene diamine; polyalkylene amines, e.g., diethylenetriamine and triethylenetetramine.

Examples of the alicyclic amines include isophorone diamine, cyclohexylene diamine and dicyclohexyl methane diamine.

Among the heterocyclic amines is aminoethyl pyperazine. Examples of the aromatic amines include aniline, phenylene diamine, diaminotoluene, xylylene diamine, methylene dianiline and diphenyl ether diamine.

In the formula, at least one of Z and n X's has five to 20 carbon atoms. In case n is not smaller than two, X may be either the same or different.

The molecular weight of the compound (e) is generally between 400 to 4,000, preferably between 500 and 2,000, and especially preferably between 600 and 1,500. Compounds with a molecular weight of less than 400 tend to evaporate and are not desirable. With the molecular weight exceeding 4,000, the compounds are insufficient in effect of reducing the dust-scattering and are not desirable, either.

[Concrete Examples of Method for Producing (Poly) oxyalkylene compound (e)]

The following 1) to 3) methods of making the compound (e) may be cited:

1) Alkylene oxide is first addition-polymerized to a compound having n active hydrogen atoms. Then an esterification reaction is initiated by adding a monohydric carboxylic acid or its ester-forming derivative (acid anhydride, acid chloride, lower alkyl ester etc.), thereby blocking n terminal hydroxyl groups.

2) Alkylene oxide is first addition-polymerized to at least one compound selected from the group consisting of a compound having one hydroxyl group, and monohydric carboxylic acid or its ester-forming derivative (acid anhydride, acid chloride, lower alkyl ester etc.). Then a compound having n active hydrogen atoms is added to block the terminal hydroxyl group of the alkylene oxide adduct.

3) Monohydric carboxylic acid or its ester-forming derivative (acid anhydride, acid chloride, lower alkyl ester etc.) is added to a polyalkylene glycol obtained by ring-opening polymerization of alkylene oxide to initiate an esterification reaction, thereby blocking the terminal hydroxyl group.

Alkylene oxides suitable for use in the aforesaid production methods 1) to 3) include alkylene oxides with two to four carbon atoms such as ethylene oxide (EO), propylene oxide (PO), and 1,2-, 1,3-, 2,3- and 1,4-butylene oxides.

Those alkylene oxides may be used alone or in combination of two or more types. In case two or more types are used in combination, the polymer obtained may be a block polymer or random polymer.

Examples of the aforesaid monohydric carboxylic acids include acetic acid, propionic acid, 2-ethyl hexanoic acid, caproic acid, caprylic acid, capric acid, lauric acid, myristic acid, palmitic acid, stearic acid, oleic acid, linolic acid and linolenic acid. Among them, preferred are lauric acid and oleic acid.

Examples of the aforesaid compounds having one hydroxyl group are methanol, ethanol, propanol, butanol, amyl alcohol, lauryl alcohol, myristyl alcohol, cetyl alcohol, stearyl alcohol and oleyl alcohol. Among them, preferred are lauryl alcohol and oleyl alcohol.

The (Poly)oxyalkylene compounds (e) may be used alone or in combination of two or more types. The compounds (e) may be solid but it is preferable that the compounds (e) are liquid or pasty at 20° C. so that the effect of reducing the dust-scattering may be enhanced. It may be so arranged that two or more types are used and at least one type is liquid or pasty.

The especially preferable compounds (e) are dilauric acid esters and dioleic acid esters of polyethylene glycol with a molecular weight of 200 to 600 (PEG 200 to 600).

[Concrete Examples of Non-essential Components]

The compositions of the present invention may contain a foam stabilizer for urethane foam molding, catalyst for polyurethane reaction and the like.

Among the foam stabilizers are silicone-type foam stabilizers used in usual urethane foam production. Among those foam stabilizers, preferred are ones with a relatively high foam-stabilizing power for soft slab foams and ones for rigid foams.

Concrete examples of the foam stabilizers for soft foams are SH-190 (produced by Toray Dow Corning Silicone Co., Ltd., Japan), L-520 and SZ-1127 (produced by Nippon Unicar Co., Ltd., Japan). Concrete examples of the foam stabilizers for rigid foams include SH-193, SH-195 (produced by Toray Dow Corning Silicone Co.,Ltd., Japan), SZ-1931, SZ-1932 (produced by Nippon Unicar Co.,Ltd., Japan).

Among the applicable catalysts are ones generally used in polyurehthane reactions. They include amine catalyzers such as triethylenediamine, N-ethyl morpholine, diethyl ethanolamine and 1,8-diazabicyclo (5, 4, 0) undecene-7; and metallic catalysts such as stannous octylate, dibutyltin dilaurate and lead octylate. Among them, preferred are metallic catalysts such as dibutyltin dilaurate and lead octylate.

In addition, the following may be added to the composition of the present invention as necessary: lubricants (e.g., calcium stearate, ethylenediamine stearylamide and oleic acid monoethanolamide); plasticizers (e.g., dioctyl phthalate and dioctyl adipate); thixotropic agents (e.g., finely powdered silica); ultraviolet absorbers; anti-aging agents; antioxidants; colorants (dye and pigments); flame retarders; antimolds; antibacterial agents and the like.

[Composition]

The following are the respective components in the composition of the present invention and the amounts of the respective components in the molding.

The mixing ratio of the active hydrogen compound containing polyol (a) to polyisocyanate (b) is generally between 80 and 140 in isocyanate index [(equivalent ratio of NCO/active hydrogen atom-contained group)×100], preferably 85 to 120, and more preferably 95 to 115. With the isocyanate index being less than 80, the moldings are not sufficient in strength and are too high in coefficient of linear expansion. Compositions with an isocyanate index exceeding 140 result in rigid and brittle moldings.

Of the fillers (c), the inorganic powders are effective in improving dimensional stability and material strength, while the hollow microspheres contribute to weight reduction and improvement in workability. The amounts to be added of those fillers are to be selected depending on the use of moldings.

To enhance the strength and dimensional stability, for example, the addition of inorganic powders is increased. If a low-density molding easy to cut is needed, hollow microspheres are added in large quantities.

The fillers (c) also act as nucleating agent and work to hold foams stable when an inert gas is dispersed in micro foams by the mechanical frothing method in a composition comprising polyols (a) and polyisocyanates (b).

The fillers (c) are added generally in two to 50 percent on the total weight of the composition, preferably 5 to 40 percent. The addition of less than two percent is not sufficient enough to hold foams stable. If the fillers (c)are applied in more than 50 percent, a viscosity of the composition will increase too high to mold properly.

The dehydrating agent (d) is added to prevent the water in the composition from foaming during the curing reaction. Foaming caused by water in the curing reaction would result in a molding with enlarged foams, that is, a coarse texture which is not good in appearance. Therefore, the addition is to be adjusted depending on the water content in the composition. When the filler is used in a large quantity, the dehydrating agent also has to be applied in a large amount.

The amount to be added of the dehydrating agent (d) is generally 0.5 to 8 percent on the total weight of the composition, and preferably 0.8 to 6 percent. If the addition is less than 0.5 percent, foaming will be caused by moisture absorption during the curing reaction, and the resulting molding will be coarse in texture and not be suitable as modeling stock. The application of the dehydrating agent in more than 8 percent would not increase the dehydrating effect from the level observed with the addition of 8 percent any more. Instead, that would deteriorate cutting workability.

The (poly)oxyalkylene compound (e) is effective in reducing the dust-scattering in cutting the molding. Moldings which have lower density are more liable to scatter much dust. So it is desirable to apply the compound (e) in slightly a larger quantity than necessary within the limit that the properties of the molding will not be impaired. The addition of the compound (e) is generally three to 30 percent on the total weight of the composition, and preferably five to 20 percent. The application in less than three percent is insufficient to produce the desired effect of reducing the dust-scattering. If, on the other hand, the addition exceeds 30 percent, then the molding will get poor in hardness and heat resistance.

The foam stabilizer is applied generally in not larger than three percent, preferably 0.1 to 3 percent, and especially preferably 0.2 to 2 percent. In the mechanical frothing which will be described later, if the addition is less than 0.1 percent, sometimes it can be difficult to keep the inert gas dispersed minutely and obtain a molding with a desired density and foam diameter. If applied in more than three percent, on the other hand, the foam stabilizer will tend to bleed out on the surface of the molding.

As to the catalysts, the addition of metallic catalyst is generally not more than 0.2 percent on the total weight of the composition, preferably 0.001 to 0.2 percent, and especially preferably 0.01 to 0.1 percent. If the addition of the catalyst is less than 0.001 percent, sometimes the foams in the molding can grow large, the molding getting too coarse in texture to use as modeling stock. The texture of moldings gets finer as the addition of the catalyst increases, which is desirable for the modeling stock. But if the addition exceeds 0.2 percent, the composition will harden too early to mold.

[Molding]

The composition of the present invention is usually prepared from two components: a component comprising polyol (a), or OH component for short, and another component comprising organic polyisocyanate (b), or NCO component for short.

The filler (c), dehydrating agent (d), (poly)oxyalkylene compound (e), foam stabilizer etc. are usually comprised in the OH component but may be also comprised in the NCO component. Especially in case the filler is to be used in a large quantity, it is desirable to add part thereof in the NCO component.

The OH component and the NCO component can be obtained by mixing their respective basic materials by a mixing tank equipped with a propeller-type, paddle-type or other type stirring blade, planetary mixer, Hobart mixer or the like. The basic materials to be applied in small quantities such as colorants and catalysts may be mixed either in the OH component beforehand or in the mixer when the two components are mixed before curing.

The rigid polyurethane foam of the present invention is obtained by curing the inventive composition with a large number of micro foams dispersed therein.

The typical procedure of making a molded article of the present invention is this:

1) The OH component and NCO component are prepared as mentioned above.

2) The OH component, NCO component and, as necessary, an inert gas are mixed in a specific ratio and the mixture is then poured into a mold.

3) The material is allowed to cure in the mold and thus a molded object is released.

The suitable mixing method is the mechanical frothing method in which the OH component, NCO component and the inert gas are homogeneously mixed using a mixer with a high shearing force such as an Oakes mixer.

The mechanical frothing method is suitable for continuously mixing the gas into the liquid composition and can disperse a large amount of inert gas in the form of micro foams uniformly into the molding composition of the present invention.

In case an inert gas is not mixed or mixed in only a small quantity, the mixing may be effected batch-wise. In this case, the Hobart mixer, for example, is used.

Suitable inert gases to be mixed with the OH component and NCO component in the molding of the present invention by the mechanical frothing method are those which do not react with the OH component or NCO component and do not liquefy under the atmospheric pressure at −30° C. Preferred are air, nitrogen and carbonic acid gas. The amount of the inert gas to be mixed is generally 10 to 70 percent and preferably 20 to 60 percent on the combined volume of inert gas and the composition.

The density of the molding of the present invention is generally 0.10 to 1.40 g/cm$^3$, preferably 0.10 to 0.80 g/cm$^3$, and especially preferably 0.15 to 0.50 g/cm$^3$.

Reinforcing materials may be used in making a molded article of the present invention with the inventive composition. In this method, reinforcing materials such as fibers, nonwoven fabrics and woven fabrics are impregnated with a mixture of the aforesaid OH component and NCO component (with either the inert gas dispersed or not dispersed), followed by curing. Moldings which are light yet high in bending strength can be obtained by such a method. The reinforcing materials may be either inorganic ones such as glass, carbon and ceramics or synthetic polymers such as vinylon, Kevlar and acryl.

No restriction is placed on the shape and form of moldings of the present invention in particular. The moldings may be made in cube, plate, prism or the like. Moldings in those forms would be handy, because many pieces of a size could be stored, packed or transported in the piled form. In cutting work, too, it is convenient, because it facilitates selection of a piece of cubic modeling stock in the size suited to the needed shape.

The moldings of the present invention can be cut (or ground) to be shaped into a desired model by machining as with an NC machine or manual working as with chisels, plane, saw and the like. The moldings of the present invention have an advantage over the prior art in that dust-scattering in cutting (grinding included) and other work is markedly reduced.

EXAMPLES

To further illustrate this invention, and not by way of limitation, some examples are given in which the following raw materials were used and evaluation was performed in the following way:

Raw Materials Used

Polyol (a1): polyether polyol with a hydroxyl value of 400 obtained by adding PO to glycerol Polyol (a2): polyether polyol with a hydroxyl value of 400 obtained by adding PO to pentaerythritol Polyisocyanate (b1): polymethylene polyphenyl isocyanate ("Millionate MR-200" produced by Nippon Polyurethane Industry Co., Ltd., Japan)

Hollow microspheres(cl): hollow thermoplastic resin microspheres ("Matsumoto Microsphere MFL-80GCA" produced by Matsumoto Yushi-Seiyaku Co., Ltd., Japan)

Inorganic powder (c2): calcium carbonate ("Whitone SB" produced by Shiraishi Calcium Co., Ltd., Japan)

Dehydrating agent (d1): molecular sieves ("Molecular Sieve 3A-B Powder" produced by Union Showa K. K., Japan)

Foam stabilizer: silicone-type foam stabilizer ("SZ-1931" produced by Nippon Unicar Co.,Ltd., Japan)

(Poly) oxyalykylene compounds (e):

Compound (e1): oleic acid diester (molecular weight: 1,000) of PEG

Compound (e2): lauric acid diester (molecular weight: 600) of PEG

Compound (e3): oleic acid diester (molecular weight: 900) of PEG

Compound (e4): acetylated product (molecular weight: 1,500) of a compound obtained by adding propylene oxide to myristyl alcohol Compound (e5): diesterified product (molecular weight: 700) of adipic acid and a compound obtained by adding propylene oxide to 2-ethyl hexanol Compound (e6): diesterified product (molecular weight: 1,000) of phthalic anhydride and a compound obtained by adding propylene oxide to myristyl alcohol Dust-scattering A molding sample was cut by a band saw. Five grams of the saw dust produced was placed in a 300-ml glass bottle, which was then shaken strongly up and down several times. The bottle was then left standing. Three seconds after that, the dust-scattering in the bottle was visually observed and evaluated. The results are shown using three degrees of symbols: ○, Δ and x. The symbol ○ indicates dust-scattering hardly observed; Δ, a little dust-scattering; and x, much dust-scattering.

Hardness

The hardness was measured in accordance with the procedure described in ASTM D 2240 using an apparatus "Model D Hardness Tester" (manufactured by Kobunshi Keiki Co.,Ltd., Japan).

Thermodeformation Temperature

Measurements were taken in accordance with JIS K6911 using an apparatus "HDT Tester" (manufactured by Toyo Seiki Seisaku-sho Ltd., Japan).

Manual Workability

Moldings with a density of not higher than 0.5 g/cm$^3$ were evaluated. Three kinds of tests were conducted: cutting by chisel, stringing or continuity of sawdust and polishing with a sand paper, and those three test results were evaluated on the basis of five degrees from one to five. Degree 1 indicates the poorest manual workability and degree 5 indicates the best in manual workability.

Examples 1 to 9

The raw materials for the OH component and those for the NCO components were weighed as indicated in Table 1 and were separately stirred in the planetary mixer at 130 rpm for ten minutes to produce an OH component and an NCO component of the present invention.

The OH component and the NCO component were then so weighed in a one-liter container in ratios indicated in Table 1 that the combined weight of the two components came to some 400 g and mixed by propeller blades for about one minute. The mixture was poured into a metal mold 50 mm×50 mm×200 mm in size and cured by heating for two hours at 80° C. It was then allowed to cool and left standing for 8 hours and released from the mold. The evaluation results of the respective moldings are enumerated in Table 1.

Comparative Examples 1, 2

In comparative tests, moldings were prepared of the basic materials in parts by weight as shown in Table 1 in the same manner as Examples 1 to 9. The evaluation results are shown in Table 1.

Machinery Co.,Ltd., Japan) with the rotor turning at 300 rpm. And air was fed continuously at the inlet of the mixing head of the frothing machine at ratios shown in Table 2. Then, a mixed solution with micro foams uniformly dispersed came out continuously from the outlet of the mechanical frothing machine.

The mixed solution was poured up to a thickness of 100 mm into an aluminum mold 500 mm×500 mm×200 mm in

TABLE 1

|  | Example | | | | | | | | | Comparative Example | |
|---|---|---|---|---|---|---|---|---|---|---|---|
|  | 1 | 2 | 3 | 4 | 5 | 6 | 7 | 8 | 9 | 1 | 2 |
| OH component [parts by weight] | | | | | | | | | | | |
| Polyol (a1) | 39.5 | 37.0 | 32.0 | 29.5 | 37.0 | 37.0 | 37.0 | 37.0 | 37.0 | 42.0 | 24.5 |
| Microsphere (c1) | 6.0 | 6.0 | 6.0 | 6.0 | 6.0 | 6.0 | 6.0 | 6.0 | 6.0 | 6.0 | 6.0 |
| Dehydrating agent (d1) | 3.0 | 3.0 | 3.0 | 3.0 | 3.0 | 3.0 | 3.0 | 3.0 | 3.0 | 3.0 | 3.0 |
| Compound (e1) | 5 | 10 | 20 | 25 | | | | | | | 35 |
| Compound (e2) | | | | | 10 | | | | | | |
| Compound (e3) | | | | | | 10 | | | | | |
| Compound (e4) | | | | | | | 10 | | | | |
| Compound (e5) | | | | | | | | 10 | | | |
| Compound (e6) | | | | | | | | | 10 | | |
| Foam stabilizer | 1.0 | 1.0 | 1.0 | 1.0 | 1.0 | 1.0 | 1..0 | 1.0 | 1.0 | 1.0 | 1.0 |
| Catalyst | 0.04 | 0.04 | 0.04 | 0.04 | 0.04 | 0.04 | 0.04 | 0.04 | 0.04 | 0.04 | 0.04 |
| NCO component [parts by weight] | | | | | | | | | | | |
| Polyisocyanate (b1) | 39.5 | 37.0 | 32.0 | 29.5 | 37.0 | 37.0 | 37.0 | 37.0 | 37.0 | 42.0 | 24.5 |
| Microsphere (c1) | 6.0 | 6.0 | 6.0 | 6.0 | 6.0 | 6.0 | 6.0 | 6.0 | 6.0 | 6.0 | 6.0 |
| Evaluation | | | | | | | | | | | |
| Density (g/cm$^3$) | 0.62 | 0.64 | 0.65 | 0.63 | 0.64 | 0.64 | 0.65 | 0.65 | 0.65 | 0.62 | 0.65 |
| Hardness (Shore D) | 60 | 58 | 54 | 50 | 56 | 58 | 57 | 58 | 58 | 60 | 40 |
| Thermodeformation Temperature (° C.) | 80 | 77 | 72 | 67 | 76 | 77 | 76 | 77 | 77 | 80 | 54 |
| Dust-scattering | Δ | ○ | ○ | ○ | ○ | Δ | Δ | Δ | Δ | X | ○ |

Note:
Compounds (e1) to (e6) in the OH component column are all (poly) oxyalkylene compounds.

Examples 10 to 16

The raw materials for the OH component and those for the NCO components were weighed as indicated in Table 2 and were separately stirred in the planetary mixer at 130 to 200 rpm for ten minutes to produce an OH component and an NCO component of the present invention.

The OH component and the NCO component were then fed continuously at the rate of a total of 10 to 20 L/minute to a inlet of a mechanical frothing machine "Model FM-350 Mechanical Frothing Machine" (manufactured by Toho size and cured by heating for two hours at 80° C. It was then allowed to cool and left standing for 8 hours and released from the mold. The evaluation results of the respective moldings are enumerated in Table 2.

Comparative Examples 3 to 5

In comparative tests, moldings were prepared of the basic materials in the parts, by weight, as shown in Table 2 in the same manner as Examples 10 to 16. The evaluation results are shown in Table 2.

TABLE 2

|  | Example | | | | | | | Comparative Example | | |
|---|---|---|---|---|---|---|---|---|---|---|
|  | 10 | 11 | 12 | 13 | 14 | 15 | 16 | 3 | 4 | 5 |
| OH component [parts by weight] | | | | | | | | | | |
| Polyol (a1) | 34.5 | 32.0 | 29.5 | 29.0 | 38.5 | 37.5 | 25.0 | 39.5 | 39.5 | 32.5 |
| Microsphere (c1) | 8 | 8 | 8 | 6 | 8 | | | 8 | 8 | |
| Inorganic powder (c2) | | | | 5 | | 10 | 15 | | | 15 |

TABLE 2-continued

|  | Example | | | | | | | Comparative Example | | |
| --- | --- | --- | --- | --- | --- | --- | --- | --- | --- | --- |
|  | 10 | 11 | 12 | 13 | 14 | 15 | 16 | 3 | 4 | 5 |
| Dehydrating agent (d1) | 4.0 | 4.0 | 4.0 | 4.0 | 4.0 | 4.0 | 4.0 | 4.0 | 4.0 | 4.0 |
| Compound (e1) | 10 | 15 | 20 | 15 | 10 | 10 | 15 | | | |
| Foam stabilizer | 1.0 | 1.0 | 1.0 | 1.0 | 1.0 | 1.0 | 1.0 | 1.0 | 1.0 | 1.0 |
| Catalyst | 0.04 | 0.04 | 0.04 | 0.04 | 0.04 | 0.04 | 0.04 | 0.04 | 0.04 | 0.04 |
| NCO component [parts by weight] | | | | | | | | | | |
| Polyisocyanate (b1) | 34.5 | 32.0 | 29.5 | 29.0 | 38.5 | 37.5 | 25.0 | 39.5 | 39.5 | 32.5 |
| Microsphere (c1) | 8 | 8 | 8 | 6 | | | | 8 | 8 | |
| Inorganic powder (c2) | | | | 5 | | | 15 | | | 15 |
| Air quantity (vol %) | 20 | 40 | 60 | 50 | 50 | 50 | 70 | 20 | 60 | 60 |
| Evaluation | | | | | | | | | | |
| Density (g/cm³) | 0.47 | 0.31 | 0.20 | 0.30 | 0.33 | 0.48 | 0.33 | 0.48 | 0.20 | 0.34 |
| Manual workability | 3 | 4 | 5 | 4 | 4 | 3 | 4 | 1 | 3 | 2 |
| Dust-scattering | ○ | ○ | ○ | ○ | ○ | ○ | ○ | X | X | X |

*vol % = [Air quantity/(Air quantity + Total volume of the composition) × 100]
The quantity of air indicated is the volume measured at one atom at 25° C.

Industrial Applicability

The composition of the present invention can produce rigid foamed polyurethanes with the hardness and thermo-deformation temperature maintained at the levels required for cutting work while substantially reducing dust-scattering in cutting.

While the conventional compositions with a low density or a high filler content cause much dust-scattering, the composition of the present invention causes low dust-scattering, which contributes improvement of the working environment.

Furthermore, moldings produced of the composition of the present invention are improved in cutting processability.

Because of those advantages, the moldings of the composition of the present invention are useful as modeling stock for design models, mock-up models, master models, copying models etc.; as mold making material as for vacuum mold; as material for inspection jigs; decorative furniture; engravings, wood works etc.

What is claimed is:

1. A foamed rigid polyurethane-forming composition, which comprises:

a polyol with a hydroxyl value of 200 to 700 (a); an organic polyisocyanate (b); a filler including an inorganic powder and/or a hollow microsphere (c); and a dehydrating agent (d);

wherein said composition further comprises 3 to 30 percent, based on the total weight of the composition, of a (poly) oxyalkylene compound (e) expressed by the general formula

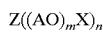

in which "A" represents an alkylene group with two to four carbon atoms, "X" is a hydrocarbyl group or an acyl group, "m" is a value of one to one hundred, "n" is an integer of one to six, "Z" is a residue of a compound containing n active hydrogen atoms, from which the active hydrogen atoms have been removed, at least one of Z and X contains 5 to 20 carbon atoms, and "X" is either the same or different when "n" is two or more.

2. The composition according to claim 1, wherein the (poly) oxyalkylene compound (e) is liquid at 20° C.

3. A foamed rigid polyurethane molding obtained by curing a composition comprising a polyol with a hydroxyl value of 200 to 700 (a); an organic polyisocyanate (b); a filler including an inorganic powder and/or a hollow microsphere (c); and a dehydrating agent (d);

wherein said composition further comprises 3 to 30 percent, based on the total weight of the composition, of a (poly)oxyalkylene compound (e) expressed by the general formula

in which "A" represents an alkylene group with two to four carbon atoms, "X" is a hydrocarbyl group or an acyl group, "m" is a value of one to one hundred, "n" is an integer of one to six, "Z" is a residue of a compound containing n active hydrogen atoms, from which the active hydrogen atoms have been removed, at least one of Z and X contains 5 to 20 carbon atoms, and "X" is either the same or different when "n" is two or more; and said curing is effected under finely dispersed bubble conditions.

4. The molding according to claim 3, wherein the (poly) oxyalkylene compound (e) is liquid at 20° C.

5. The molding according to claim 3, wherein the (poly) oxyalkylene compound (e) is a dilauric acid ester or dioleic acid ester of polyethylene glycol with an average molecular weight of 200 to 600.

6. The molding according to claim 3, wherein the finely dispersed bubble containing conditions are effected by a mechanical frothing method.

7. The molding according to claim 3, wherein the finely dispersed bubble containing conditions produce finely dispersed bubbles having an average diameter of not more than 150 microns and are contained in the composition in an amount of 10–70 volume %.

8. The molding according to claim 3, wherein said molding has a density of 0.15–0.50 g/cm³.

9. A method of making a foamed rigid polyurethane molding, which comprises curing a composition comprising: a polyol with a hydroxyl value of 200 to 700 (a); an organic polyisocyanate (b); a filler including an inorganic powder and/or a hollow microsphere (c); and a dehydrating agent (d);

wherein said composition further comprises 3 to 30 percent, based on the total weight of the composition, of a (poly)oxyalkylene compound (e) expressed by the general formula $$Z(AO)_m X)_n$$

in which "A" represents an alkylene group with two to four carbon atoms, "X" is a hydrocarbyl group or an acyl group, "m" is a value of one to one hundred, "n" is an integer of one to six, "Z" is a residue of a compound containing n active hydrogen atoms, from which the active hydrogen atoms have been removed, at least one of Z and X contains 5 to 20 carbon atoms, and "X" is either the same or different when "n" is two or more; and said curing being carried out by a mechanical frothing method.

10. A model obtained by cutting or grinding the molding according to any one of claims 6–8.

11. In a process of producing a cut- or ground-finished article, which comprises cutting or grinding a foamed rigid polyurethane molding obtained by curing a composition comprising: a polyol with a hydroxyl value of 200 to 700 (a), an organic polyisocyanate (b), a filler including an inorganic powder and/or a hollow microsphere (c), and a dehydrating agent (d); the improvement wherein the composition further comprises a (poly) oxyalkylene compound (e) expressed by the general formula $$Z((AO)_m X)_n$$

in which "A" represents an alkylene group with two to four carbon atoms, "X" is a hydrocarbyl group or an acyl group, "m" is a value of one to one hundred, "n" is an integer of one to six, "Z" is a residue of a compound containing n active hydrogen atoms, from which the active hydrogen atoms have been removed, at least one of Z and X contains 5 to 20 carbon atoms, and "X" is either the same or different when "n" is two or more, whereby dust-scattering during the cutting or grinding is reduced.

* * * * *